United States Patent [19]

Kapur et al.

[11] 4,388,080

[45] Jun. 14, 1983

[54] PROCESS FOR RECOVERY OF HIGH PURITY SILICON

[75] Inventors: Vijay K. Kapur; Ashok K. Khanna, both of Northridge, Calif.

[73] Assignee: Atlantic Richfield Company, Los Angeles, Calif.

[21] Appl. No.: 348,468

[22] Filed: Feb. 12, 1982

[51] Int. Cl.$^3$ .................... B01D 21/01; G01B 33/02
[52] U.S. Cl. .................... 23/293 R; 134/2; 156/DIG. 64; 423/348
[58] Field of Search ............ 23/293 R, 300, 313 R; 264/37; 134/2; 156/DIG. 64; 423/348; 29/575, 583; 210/705; 209/5

[56] References Cited

U.S. PATENT DOCUMENTS

| | | | |
|---|---|---|---|
| 3,257,081 | 6/1966 | Brown et al. | 264/37 |
| 4,129,457 | 12/1978 | Basi | 134/2 |
| 4,256,571 | 3/1981 | Somasundaran et al. | 209/5 |

FOREIGN PATENT DOCUMENTS

| | | | |
|---|---|---|---|
| 2201276 | 8/1972 | Fed. Rep. of Germany | 423/348 |
| 56-115611 | 9/1981 | Japan | 23/293 R |

OTHER PUBLICATIONS

Meek et al., "Silicon Surface Contamination: Polishing and Cleaning", J. Electrochem. Soc., vol. 120, No. 9, pp. 1241 and 1242, Sep. 1973.

Dessaver et al., "Recovering Semiconductor Waste Material", IBM Technical Disclosure Bulletin, vol. 10, No. 1, Jun. 1967.

*Primary Examiner*—Bradley Garris
*Attorney, Agent, or Firm*—Roderick W. MacDonald

[57] ABSTRACT

A method of recovering silicon from an aqueous slurry containing finely divided silicon particles comprising mixing at least one flocculating agent with the slurry, allowing silicon flocs to form and physically separating the silicon flocs from the slurry for re-use of the silicon contained therein.

9 Claims, No Drawings

PROCESS FOR RECOVERY OF HIGH PURITY SILICON

BACKGROUND OF THE INVENTION

In industries such as the semi-conductor industry and the photovoltaic industry, silicon is a widely used material. In making silicon chips for semi-conductor devices and silicon wafers for photovoltaic panels, waste silicon is generated which is preferably recovered for re-use since these industries employ an expensive, high purity silicon to start with.

For example, in the photovoltaic industry single crystal ingots of silicon are formed at considerable cost. Silicon ingots are ground to an exact diameter and then sawed into individual wafers for further processing into the final photovoltaic panel. Operations such as grinding, sawing, and the like generate finely subdivided silicon particles which are often suspended in an aqueous medium. For example, ingots of single crystal silicon are cut into wafers using a wafer cooling medium, the water containing one or more detergents to keep the silicon particles from sticking to the saw blade. The result of this type of sawing operation is waste silicon particles of very small size and dispersed in an aqueous medium forming a colloidal solution. This is characterized as a silicon slurry. The silicon particles dispersed in this slurry are high purity particles which are preferably recovered and re-used to make other single crystal ingots, semiconductors, and the like, rather then disposed of as waste.

SUMMARY OF THE INVENTION

According to this invention, high purity silicon is recovered from an aqueous slurry containing same by employing a flocculating agent to form silicon flocs which are then physically separated from the slurry and recovered for re-use of the silicon as desired.

Accordingly, it is an object of this invention to provide a new and improved method for recovering silicon from a slurry thereof for re-use of the silicon. It is another object to provide a new and improved method for recovering high purity silicon which would otherwise be waste in various semiconductor and photovoltaic processing schemes.

Other aspects, objects and advantages of this invention will be apparent to those skilled in the art from this disclosure and the appended claims.

DETAILED DESCRIPTION OF THE INVENTION

More specifically, in accordance with this invention, an aqueous slurry containing finely divided silicon particles is mixed with one or more silicon flocculating agents selected from the group consisting of alkaline earth metal oxide, alkaline earth metal hydroxide, a cationic polymer of the formula:

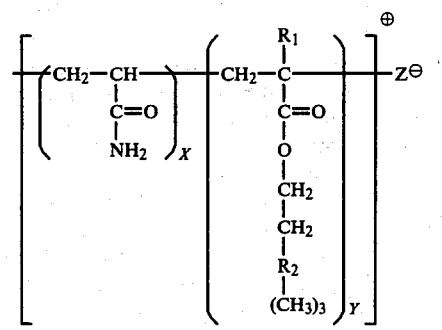

Where X varies from 70 to 98 mol %; Y varies from 2 to 30 mol %; Z is selected from the group consisting of chloride and $CH_3SO_4^-$; $R_1$ is selected from the group consisting of H and $-CH_3$; and $R_2$ is selected from the group consisting of $-CH_3$ and $-CH_2CH_3$.

The amount of flocculating material employed can vary widely depending upon the flocculating agent or the composition of the slurry, but is always used in an amount needed to flocculate silicon effectively, and will generally be used in an amount of from about 20 to about 30 weight ppm based upon the total weight of the slurry. The mixing of flocculating agent with the slurry is carried out in a conventional manner under ambient conditions of temperature and pressure, although elevated temperatures can be employed if desired so long as the temperatures are non-deleterious to the materials in the slurry, especially the silicon. For example, it is not desirable to employ temperatures which encourage the oxidation of the silicon in the slurry.

The mixture of slurry and flocculating agent is then held for a time under ambient conditions of temperature and pressure until silicon flocs float on top of the slurry. The flocculating agent mixing step and this holding step can be employed sequentially or simultaneously or at least overlapping one another so long as reasonable size silicon flocs are ultimately formed. After the flocs are formed, they are physically separated from the slurry by any conventional manner such as decanting, bag filtering if batch processing is employed, rotary vacuum filtering if a continuous process is employed, and the like. Filtering can be carried out on a given material more than one time if desired.

The sepatated silicon flocs are then recovered for re-use of the silicon contained therein. Of course, further processing of the silicon flocs for purification thereof can be employed if it is desired to employ the silicon in a higher purity process since some silicon oxide can be contained in these flocs. However, the desired re-use of the silicon, whether in the semiconductor industry or photovoltaic industry, etc., and the required purity for any such re-use are well known to those skilled in the art and further details in this area are not necessary for those skilled in the art.

When calcium oxide solid is employed as the only or primary flocculating agent, it is preferably employed in an amount of from about 300 mg to about 500 mg weight for a total volume of one liter of the slurry. Similarly, when calcium hydroxide solution is employed, the solution is equivalent to dissolving 300 mg of calcium oxide in one liter of the slurry.

Of course, the remaining slurry, after removal of the silicon flocs is a relatively pure liquid which can also be recycled for re-use as desired.

This invention is particularly applicable to those processes such as sawing and grinding which generate a very fine silicon waste material. For example, a typical grinder slurry and a typical silicon wafer sawing slurry were each found to contain silicon particles, the majority of which were in the 5 to 25 micron size range, with a substantial minority, i.e., greater than 30 weight percent of the silicon present, below 5 microns in size. Thus, this invention is particularly applicable to those processes which generate submicron to semicolloidal silicon suspensions because simple gravity settling or even filtering without flocculation is not effective for separating such very small silicon particles.

EXAMPLE

An aqueous silicon slurry formed from sawing on a single crystal silicon ingot was found to contain 2.5 grams of suspended silicon particles per liter of aqueous slurry material. The silicon particles were distributed based on the total weight of the silicon present so that 36 weight percent of the silicon particles were below 5 microns in size, 51.5 weight percent of the silicon particles were in the range of 5 to 25 microns, and 12.5 weight percent of the silicon solids were larger than 25 microns. There was mixed with this slurry 300 milligrams (mg) of calcium oxide per liter of slurry, the mixing being carried out at room temperature under atmospheric pressure followed by 30 minutes fast mixing with a high speed blender. After mixing silicon flocs were formed. The slurry containing the silicon flocs was filtered using a pressure bag filter at ambient conditions of temperature. The thus recovered silicon flocs were analyzed after drying and were found to contain 98 weight percent silicon of 99.9% purity with only minor amounts of silicon oxide present and calcium hydroxide/silicate. This silicon was useful for re-use in forming single crystal silicon ingots for sawing additional silicon wafers therefrom.

Reasonable variations and modifications are possible within the scope of this disclosure without departing from the spirit and scope of this invention.

The embodiments of the invention in which an exclusive property or privilege is claimed are defined as follows:

1. A method for recovering high purity silicon from an aqueous slurry containing finely divided silicon particles of high purity comprising mixing with said slurry at least one silicon flocculating agent selected from the group consisting of alkaline earth metal oxide, alkaline earth metal hydroxide, a cationic polymer of the formula:

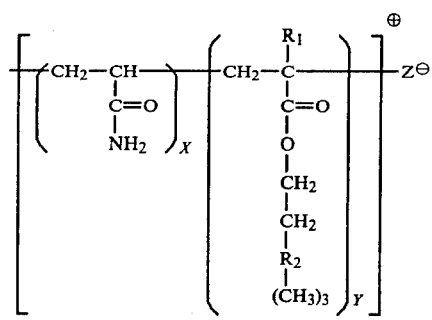

where X varies from 70 to 98 vol%; Y varies from 2 to 30 mol%; Z is selected from the group consisting of chloride and $CH_3SO_4^-$; $R_1$ is selected from the group consisting of H and $-CH_3$; and $R_2$ is selected from the group consisting of $-CH_3$ and $-CH_2CH_3$; said flocculating agent being employed in an effective silicon flocculating amount, holding said mixture until silicon flocs form, physically separating said silicon flocs from said slurry, and recovering said silicon flocs for re-use of the high purity silicon contained therein.

2. The method according to claim 1 wherein said flocculating agent is employed in an amount of from about 20 to about 30 weight ppm based on the weight of said slurry.

3. The method according to claim 1 wherein said flocculating agent is calcium oxide.

4. The method according to claim 3 wherein from about 300 mg to about 500 mg weight percent calcium oxide is employed.

5. The method according to claim 1 wherein said flocculating agent is calcium hydroxide.

6. The method according to claim 5 wherein a solution of calcium hydroxide is employed, which is equivalent to dissolving 300 to 500 mgs of calcium oxide in one liter of the slurry.

7. The method according to claim 1 wherein said mixing and holding steps are carried out under ambient temperature conditions.

8. The method according to claim 1 wherein said silicon flocs are separated from said slurry by filtering.

9. The method according to claim 1 wherein said silicon flocs are separated from said slurry by decantation.

* * * * *